United States Patent
Ha et al.

(10) Patent No.: US 12,037,450 B2
(45) Date of Patent: Jul. 16, 2024

(54) LIQUID CRYSTAL POLYESTER RESIN COMPOSITION FOR ULTRA-THIN INJECTION AND MANUFACTURING METHOD THEREOF

(71) Applicant: SEYANG POLYMER, Incheon (KR)

(72) Inventors: Tae-Young Ha, Incheon (KR); Sun Hwa Jang, Yongin-si (KR); Sung Eun Kim, Cheonan-si (KR); Youn Eung Lee, Daejeon (KR); Jin Kyu Lee, Hwaseong-si (KR)

(73) Assignee: SEYANG POLYMER, Incheon (KR)

(*) Notice: Subject to any disclaimer, the term of this patent is extended or adjusted under 35 U.S.C. 154(b) by 223 days.

(21) Appl. No.: 17/367,717

(22) Filed: Jul. 6, 2021

(65) Prior Publication Data
US 2022/0169783 A1    Jun. 2, 2022

(30) Foreign Application Priority Data

Nov. 30, 2020   (KR) ........................ 10-2020-0165201

(51) Int. Cl.
| | | |
|---|---|---|
| *C08G 63/60* | (2006.01) | |
| *C08G 63/81* | (2006.01) | |
| *C08G 63/83* | (2006.01) | |
| *C08K 3/04* | (2006.01) | |
| *C08K 3/40* | (2006.01) | |
| *C08K 7/14* | (2006.01) | |
| *C08K 9/06* | (2006.01) | |
| *C08K 13/04* | (2006.01) | |
| *C08K 13/06* | (2006.01) | |

(52) U.S. Cl.
CPC ............ *C08G 63/605* (2013.01); *C08G 63/81* (2013.01); *C08G 63/83* (2013.01); *C08K 3/04* (2013.01); *C08K 3/40* (2013.01); *C08K 7/14* (2013.01); *C08K 9/06* (2013.01); *C08K 13/04* (2013.01); *C08K 13/06* (2013.01); *C08G 2250/00* (2013.01); *C08K 2201/014* (2013.01)

(58) Field of Classification Search
CPC ................................ C08K 3/40; C08G 63/605
See application file for complete search history.

(56) References Cited

U.S. PATENT DOCUMENTS 9,994,771 B2 * 6/2018 Hegi .................. C09K 19/3809

FOREIGN PATENT DOCUMENTS

| EP | 3738737 A1 * | 11/2020 | ............. B29B 11/16 |
| JP | 2008013702 A * | 1/2008 | |
| JP | 2012201836 A * | 10/2012 | |
| JP | 2018109090 A * | 7/2018 | |

OTHER PUBLICATIONS

Machine translation of JP 2018-109090 A, published Jul. 12, 2018.*

* cited by examiner

*Primary Examiner* — Vickey Nerangis
(74) *Attorney, Agent, or Firm* — Goldilocks Zone IP law

(57) ABSTRACT

The present disclosure relates to a liquid crystal polyester composition that can be injection molded into an ultra-thin film and has improved fluidity, and a manufacturing method thereof. The polyester resin composition for ultra-thin injection molding includes 60 to 85% by weight of a liquid crystal polyester resin and 15 to 40% by weight of an inorganic filler having an average cross-sectional aspect ratio of 2 to 6, based on the total weight of the composition, wherein the liquid crystal polyester resin includes 0.1 to 10 mol % of hydroxybenzoic acid (HBA), 40 to 60 mol % of hydroxynaphthoic acid, 20 to 30 mol % of biphenol, and 20 to 30 mol % of terephthalic acid. The liquid crystal polyester resin composition for ultra-thin injection molding according to the present disclosure not only has excellent mechanical strength and heat resistance, but also can exhibit very excellent fluidity in a high-speed injection process.

4 Claims, 1 Drawing Sheet

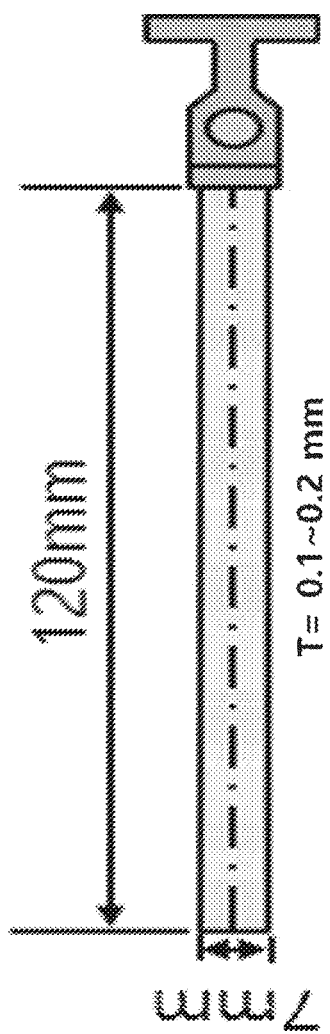

LIQUID CRYSTAL POLYESTER RESIN COMPOSITION FOR ULTRA-THIN INJECTION AND MANUFACTURING METHOD THEREOF

CROSS REFERENCE TO RELATED PATENT APPLICATION

This application is based on and claims priority under 35 U.S.C. § 119 from Korean Patent Application No. 10-2020-0165201, filed on Nov. 30, 2020, in the Korean Intellectual Property Office, the disclosure of which is incorporated by reference herein in its entirety.

BACKGROUND

Field of the Invention

The present disclosure relates to a liquid crystal polyester composition and a manufacturing method thereof, and specifically, to a liquid crystal polyester composition that can be injection molded into an ultra-thin film and has improved fluidity, and a manufacturing method thereof.

Description of the Related Art

Liquid crystal polyester resins have superior heat resistance and mechanical strength compared to other polymer resins, so they are widely used mainly in electronic devices that require precise molded articles or molding materials. In particular, they are excellent in dimensional stability and electrical insulation, so the use thereof is expanding as an electronic accessory material for small portable computers such as laptops. As the performance of such electronic accessory materials is developed day by day, there is an increasingly demanding trend in miniaturization and high density of peripheral electronic devices and accessories used inside electronic devices. To this end, these accessories need to be thinner and lighter.

However, there is a problem in that the electronic devices constituting the accessories generate heat as the electronic accessories become smaller and higher in density. Therefore, although various cooling-related devices such as small cooling fans and electronic coolers are purchased from related technology companies and mounted on electronic devices and sold to the market, with which the cooling capacity of the electronic devices has been eliminated though, it is still technically difficult to apply to portable electronic terminal devices such as ultra-thin and slim laptops by miniaturizing the size of electronic accessories as described above. In other words, a technological development is required that prevents heat generation of electronic devices due to miniaturization and high density of electronic accessories made of liquid crystal polyester resins and improves the fluidity required to form liquid crystal polyester resins into ultra-thin films through a high-speed injection process.

BRIEF SUMMARY OF THE INVENTION

In order to solve the above problems, an object of the present disclosure is to provide a liquid crystal polyester resin composition for improving fluidity in a high-speed injection process as well as excellent mechanical strength and heat resistance.

In addition, another object of the present disclosure is to provide a polyester resin composition for ultra-thin injection molding, which is capable of forming a light and slim electronic terminal device by achieving lightness, thinness and compactness of electronic accessories.

Further, another object of the present disclosure is to provide a method for manufacturing a polyester resin composition for ultra-thin injection molding.

A polyester resin composition for ultra-thin injection molding according to an aspect of the present disclosure may include 60 to 85% by weight of a liquid crystal polyester resin and 15 to 40% by weight of an inorganic filler, based on the total weight of the composition.

The liquid crystal polyester resin may include 0.1 to 10 mol % of hydroxybenzoic acid (HBA), 40 to 60 mol % of hydroxynaphthoic acid, 20 to 30 mol % of biphenol, and 20 to 30 mol % of terephthalic acid, and the inorganic filler may be surface-treated with a coupling agent, wherein the average length of the inorganic filler may be 1 to 5 mm, and the average cross-sectional aspect ratio may be 2 to 6.

In an embodiment, the liquid crystal polyester resin may be selected from the group consisting of a liquid crystal polyester amide, a liquid crystal polyester ether, a liquid crystal polyester carbonate, and a liquid crystal polyester imide.

In addition, in an embodiment of the present disclosure, the inorganic filler may be selected from the group consisting of flat glass fiber, milled glass fiber, carbon black, graphite fiber, silica fiber, silica-alumina fiber, alumina fiber, zirconia fiber, boron nitride fiber, silicon nitride fiber, boron fiber, and potassium titanate fiber.

The inorganic filler may be made of flat glass fiber or milled glass fiber as a main component, and optionally may include at least one selected from the group consisting of carbon black, graphite fiber, silica fiber, silica-alumina fiber, alumina fiber, zirconia fiber, boron nitride fiber, silicon nitride fiber, boron fiber, and potassium titanate fiber.

In another embodiment of the present disclosure, the inorganic filler may be surface-treated in advance with a coupling agent, or the inorganic filler and the coupling agent may be added together when preparing the resin composition.

In another embodiment of the present disclosure, examples of the coupling agent for treating the surface of the inorganic filler may include a functional compound such as an epoxy compound, an isocyanate compound, a titanate compound, and a silane compound.

Further, another aspect of the present disclosure is to provide a method for manufacturing a polyester resin composition for ultra-thin injection molding.

The liquid crystal polyester resin composition of the present disclosure not only has excellent mechanical strength and heat resistance, but can also exhibit very excellent fluidity in a high-speed injection process.

In addition, since the liquid crystal polyester resin composition of the present disclosure can be injection-molded into an ultra-thin film, the electronic accessories mounted inside the electronic device can be made light, thin, and compact, thereby achieving miniaturization and high density of the accessories.

Electronic accessories made of the liquid crystal polyester resin composition of the present disclosure can be injection-molded into an ultra-thin film of up to 0.1 mmt.

BRIEF DESCRIPTION OF THE DRAWINGS

FIG. 1 shows a schematic diagram of a bar-flow measuring equipment for measuring the fluidity of a composition containing a liquid crystal polyester.

DETAILED DESCRIPTION OF INVENTION

As used herein, the term "liquid crystal polyester" refers to a molten polyester having a characteristic that the molecular chains in the polymer are regularly arranged in parallel with each other in a molten state. The state of the molecules arranged in this way is often referred to as a liquid crystal state or a nematic phase of liquid crystal material, and the molecules in such polymers are generally thin, long and flat, and have very high mechanical strength, electrical properties and heat resistance along the longer chain of molecules.

The inventors of the present disclosure have studied resins that can be injection molded with a thin thickness of an ultra-thin film while maintaining the original physical properties such as excellent mechanical, thermal, electrical properties, and flame retardancy of the liquid crystal polyester resin, and as a result thereof, we have found a liquid crystal polyester resin composition having the above-described physical properties by combining a specific liquid crystal polyester resin with an inorganic filler having a predetermined average length and cross-sectional aspect ratio.

Therefore, the present disclosure provides a polyester resin composition for ultra-thin injection molding including 60 to 85% by weight of a liquid crystal polyester resin and 15 to 40% by weight of an inorganic filler, based on the total weight of the composition, wherein the liquid crystal polyester resin includes 0.1 to 10 mol % of hydroxybenzoic acid (HBA), 40 to 60 mol % of hydroxynaphthoic acid, 20 to 30 mol % of biphenol, and 20 to 30 mol % of terephthalic acid.

The liquid crystal polyester resin used in the present disclosure exhibits liquid crystallinity in a molten state, and is preferably melted at a temperature of 450° C. or less. The liquid crystal polyester resin has a weight average molecular weight of about 10,000 to 300,000, preferably about 10,000 to 50,000, when considering its mechanical strength and injection moldability. If the weight average molecular weight of the liquid crystal polyester resin is 10,000 or less, the mechanical strength is poor, which may cause damage to the molded article, and if the weight average molecular weight exceeds 300,000, injection molding is difficult due to the decrease in fluidity of the resin.

In addition, the mixing ratio of the liquid crystal polyester and the inorganic filler constituting the resin composition is important. If the liquid crystal polyester component is less than 60% by weight, or the inorganic filler component is less than 15% by weight, strength and heat resistance deteriorate, and if the above components exceed 85% by weight or 40% by weight, respectively, the fluidity is poor, and thus the ultra-thin film characteristics of the liquid crystal polyester resin composition intended in the present disclosure cannot be achieved. As used herein, the term "ultra-thin film" means that the thickness of electronic accessories manufactured from the resin composition does not exceed 0.1 mm at most.

The liquid crystal polyester resin may be selected from the group consisting of a liquid crystal polyester amide, a liquid crystal polyester ether, a liquid crystal polyester carbonate, and a liquid crystal polyester imide.

The liquid crystal polyester is preferably a wholly aromatic liquid crystal polyester formed using only an aromatic compound as a monomeric material. Typical examples of the wholly aromatic liquid crystal polyester resins include resins prepared by polymerization (polycondensation) of at least one compound selected from the group consisting of an aromatic hydroxycarboxylic acid, an aromatic dicarboxylic acid, an aromatic diol, an aromatic hydroxyamine, and an aromatic diamine; resins prepared by polymerizing a plurality of aromatic hydroxycarboxylic acids; a resin prepared by polymerizing at least one compound selected from the group consisting of an aromatic dicarboxylic acid, an aromatic diol, an aromatic hydroxyamine, and an aromatic diamine; and resins prepared by polymerizing a polyester such as polyethylene terephthalate and an aromatic hydroxycarboxylic acid.

The liquid crystal polyester resin may be prepared by polycondensing at least one of the above monomers to form a prepolymer of a liquid crystal polyester, and then solid-state polycondensing the prepolymer. By-products generated during the solid-state polycondensation reaction can be removed by purging using an inert gas or vacuum.

The blending of the inorganic filler with the liquid crystal polyester resin should be performed without impairing heat resistance, electrical properties, and mechanical properties such as strength, stiffness and hardness of the polyester resin. The inorganic filler is usually used to improve the mechanical strength and heat resistance, but in order to improve the fluidity that enables injection molding into an ultra-thin film, not a fibrous filler commonly used, but a special fibrous filler is added to the liquid crystal polyester resin. Such special fibrous filler may be used to improve the fluidity in a high-speed injection process as required in the present disclosure. Examples of the fibrous fillers include flat glass fiber, milled glass fiber, carbon black, graphite fiber, silica fiber, silica-alumina fiber, alumina fiber, zirconia fiber, boron nitride fiber, silicon nitride fiber, boron fiber, or potassium titanate fiber. These inorganic fillers may be used alone or in combination of two or more.

The inorganic filler is preferably a flat glass fiber or a milled glass fiber. That is, the flat glass fiber or milled glass fiber may be used as the inorganic filler as a main component, and the other additional inorganic fillers may be optionally added.

The inorganic filler may be blended in an amount of 15 to 40% by weight, preferably 20 to 30% by weight, based on the total weight of the resin composition. If the blending amount of the inorganic filler is less than 15% by weight, the physical properties such as tensile strength and flexural strength of the molded article deteriorate, and if it exceeds 40% by weight, the fluidity of the molded article is adversely affected.

The average length of the inorganic filler is 1 to 5 mm, and the average cross-sectional aspect ratio (ratio of horizontal length and vertical length) of its elliptical cross-section is 2 to 6.

If the average length of the inorganic filler is less than 1 mm, the mechanical properties are poor, and if it is greater than 5 mm, an extruder die nozzle generates a lot of pressure, so the extrusion process does not proceed smoothly. In addition, when the product is pelletized, the cut surface may be not smooth, so a lot of dust may be generated during the pellet mixing process.

On the other hand, if the average cross-sectional aspect ratio of the inorganic filler is less than 2, it is similar to the shape of a general chopped glass fiber, so there is no superior effect on fluidity, warpage, and strength reinforcement. If the aspect ratio is greater than 6, the extrusion process does not proceed smoothly, and the shape of the pellets of the product appears flat, which is undesirable.

According to the present disclosure, the inorganic filler may be surface treated with a coupling agent to obtain desired physical properties. Examples of the coupling agent may include a functional compound such as an epoxy compound, an isocyanate compound, a titanate compound, and a silane compound. The inorganic filler may be used after surface treatment with these compounds in advance, or may be added together when preparing the liquid crystal polyester resin composition.

Further, the conventionally known additives, such as lubricants, nucleating agents, dyes, pigments, release agents, antioxidants, reinforcing agents, etc. may be added to the liquid crystal polyester resin composition of the present disclosure in order to impart desired properties as necessary.

It is preferable that a relative injection time of the liquid crystal polyester resin composition for ultra-thin injection molding of the present disclosure is maintained at less than 8 (s) in an injection speed range of 50 to 300 mm/s. In this way, if the relative injection time is maintained below 8(s) in the injection speed range of 50 to 300 mm/s, it is advantageous for the process in that unmolding does not occur in molding 0.1 mmt products due to the high fluidity, and, further, since the injection pressure is low, there is no burr caused by an open mold. These properties can be achieved by the improved liquid crystal polyester resin composition and processing conditions of the present disclosure, which are characteristics that have not been achieved from the prior art.

The liquid crystal polyester resin composition of the present disclosure may be produced according to a conventional method used in the art. That is, if necessary, each component may be melted and kneaded by a single-screw or twin-screw extruder or a melt mixer to be manufactured into particulate material. In this case, some of the components, for example, the inorganic filler may be previously surface treated with a coupling agent and then blended into the polyester resin.

The present disclosure relates to a liquid crystal polyester resin composition having improved fluidity that enables injection molding into an ultra-thin film by including the above-described components, wherein by way of adding the inorganic filler surface-treated with a coupling agent, excellent fluidity can be obtained, and unlike the conventional one, an ultra-thin injection molded article can be manufactured without an increase in molding temperature and a decrease in physical properties. In addition, the physical properties of the molded article can be additionally improved in the presence of inorganic fillers, so that the liquid crystal polyester resin composition of the present disclosure has diverse applications, and is particularly advantageous when injection molding is performed with an ultra-thin film thickness that was not possible with other conventional resins.

Hereinafter, the present disclosure will be described in detail through the following preparation examples and working examples, and it should be noted that the present disclosure is not limited thereby.

Preparation Example 1: Preparation of Liquid Crystal Polyester Resin (1)

12,000 g (117.5 moles) of acetic anhydride was added to a 200 L batch reactor and stirred. Then, monomeric para-hydroxybenzoic acid (HBA) 600 g (4.3 moles), 6,2-hydroxynaphthoic acid (HNA) 20,000 g (106.3 moles), biphenol (BP) 10,300 g (55.3 moles), and terephthalic acid (TPA) 9,200 g (55.4 moles) were added to the reactor, and then 12,000 g (117.5 moles) of acetic anhydride was additionally added to perform uniform mixing in the batch reactor. To this mixture, 3.1 g of a potassium acetate catalyst and 12.1 g of a magnesium acetate catalyst were added, and nitrogen was injected to maintain the internal space of the batch reactor in an inactive state. Thereafter, the temperature of the batch reactor was ramped over 1 hour to a temperature at which acetic anhydride inside the reactor was refluxed, and the hydroxyl groups of the monomers were acetylated at this temperature for 2 hours. While removing acetic acids produced in the acetylation reaction and unreacted acetic anhydrides added in excess, the reaction was heated to 320° C. at a rate of 0.5° C./min to obtain a wholly aromatic liquid crystal polyester, which was discharged through a lower valve, cooled/solidified, and primary pulverized to prepare 36,000 g of liquid crystal polyester particles. Then, secondary pulverization was performed using a fine-particulate grinder, and the mixture was placed in a rotary heater and the temperature was ramped to 200° C. for 2 hours while flowing nitrogen at a flow rate of 25 L/min. After holding at this temperature for 2 hours and ramping the temperature to 312° C. at a rate of 0.2° C./min, solid-state polymerization was performed for 3 hours to obtain a liquid crystal polyester resin. The melting point of the obtained resin was 350° C.

Preparation Example 2: Preparation of Liquid Crystal Polyester Resin (2)

13,000 g (127.3 moles) of acetic anhydride was added to a 200 L batch reactor. While stirring the mixture, monomeric parahydroxybenzoic acid (HBA) 20,000 g (144.8 moles), biphenol (BP) 9,000 g (48.3 moles), terephthalic acid (TPA) 6,000 g (36.2 moles), and isophthalic acid (IPA) 2,000 g (12.1 moles) were added to the reactor, and then 14,100 g (138.1 moles) of acetic anhydride was additionally added to perform uniform mixing in the batch reactor. To this mixture, 2.8 g of a potassium acetate catalyst and 11.2 g of a magnesium acetate catalyst were added, and nitrogen was injected to maintain the internal space of the batch reactor in an inactive state. Thereafter, the temperature of the batch reactor was ramped over 1 hour to a temperature at which acetic anhydride inside the reactor was refluxed, and the hydroxyl groups of the monomers were acetylated at this temperature for 2 hours. While removing acetic acids produced by the acetylation reaction and unreacted acetic anhydrides added in excess, the reaction product was heated to 320° C. at a rate of 0.5° C./min to obtain a wholly aromatic liquid crystal polyester, which was discharged through a lower valve, cooled/solidified, and primary pulverized to prepare 32,000 g of liquid crystal polyester particles. Then, the polyester particles was secondary pulverized using a fine-particulate grinder, and the mixture was placed in a rotary heater and the temperature was ramped to 200° C. for 2 hours while flowing nitrogen at a flow rate of 25 L/min. After holding at this temperature for 2 hours and ramping the temperature to 285° C. at a rate of 0.2° C./min, solid-state polymerization was performed for 3 hours to obtain a liquid crystal polyester resin. The melting point of the obtained resin was 350° C.

Example 1

The liquid crystal polyester resin (1) obtained from Preparation Example 1, carbon black (HiBlack 30L, manufactured by Orion Engineered Carbons), and a flat glass fiber (TFG-3.0-T4355L, manufactured by Taishan Fiberglass Inc., having an average length of 3 mm and an average cross-sectional aspect ratio of 4) were mixed in a ratio of 68.8:1.2:30 based on the total weight as shown in Table 1 below, and then this mixture was melt-kneaded using a twin-screw extruder (L/D: 44, diameter: 30 mm). During the melt-kneading, the barrel temperature of the extruder was 350° C. Further, during the melt-kneading, a vacuum was applied to the twin-screw extruder to remove by-products generated during the melt-kneading to prepare a liquid crystal polyester resin composition (A). For the evaluation of physical properties, the liquid crystal polyester resin composition (A) was dried at 150° C. for 2 hours with a hot air dryer (JIB-100KW, manufactured by Jeil Industrial Equipment Co., Ltd.), and then the specimens for the evaluation of physical properties were ejected and fluidity was evaluated.

Example 2

A liquid crystal polyester resin composition (B) was prepared in the same manner as in Example 1 according to the mixing ratio shown in Table 1 below.

Example 3

A liquid crystal polyester resin composition (C) was prepared in the same manner as in Example 1 according to the mixing ratio shown in Table 1 below, except that the liquid crystal polyester resin (2) obtained in Preparation Example 2 was used instead of the liquid crystal polyester resin (1) obtained in Preparation Example 1.

Comparative Example 1

A liquid crystal polyester resin composition (D) was prepared in the same manner as in Example 1 according to the mixing ratio shown in Table 1 below, except that a chopped glass fiber (CS-923, manufactured by Owens Corning, having an average length of 3 mm and an average cross-sectional aspect ratio of 1) was used instead of the flat glass fiber of Example 1.

Comparative Example 2

A liquid crystal polyester resin composition (E) was prepared in the same manner as in Example 1 according to the mixing ratio shown in Table 1 below.

Comparative Example 3

A liquid crystal polyester resin composition (F) was prepared in the same manner as in Example 1 according to the mixing ratio shown in Table 1 below.

Comparative Example 4

A liquid crystal polyester resin composition (G) was prepared in the same manner as in Example 1 according to the mixing ratio shown in Table 1 below, except that the liquid crystal polyester resin (2) obtained in Preparation Example 2 was used instead of the liquid crystal polyester resin (1) obtained in Preparation Example 1.

TABLE 1

| | Type and content of liquid crystal polyester resin and inorganic filler | | | | |
|---|---|---|---|---|---|
| | Liquid crystal polyester resin (% by weight) Preparation Example (1) | Preparation Example (2) | Glass fiber (% by weight) a | b | Carbon black (% by weight) |
| Example 1 | 68.8 | | 30 | | 1.2 |
| Example 2 | 78.8 | | 20 | | 1.2 |
| Example 3 | | 68.8 | 30 | | 1.2 |
| C. Example 1 | 68.8 | | | 30 | 1.2 |
| C. Example 2 | 88.8 | | 10 | | 1.2 |
| C. Example 3 | 58.8 | | 40 | | 1.2 |
| C. Example 4 | | 68.8 | | 30 | 1.2 |

Glass fiber a: flat glass fibers with an average length of 3 mm and an average cross-sectional aspect ratio (horizontal length/vertical length) of 4, surface-treated with a silane-based coupling agent
Glass fiber b: chopped glass fibers with an average length of 3 mm and an average cross-sectional aspect ratio (horizontal length/vertical length) of 1, surface-treated with a silane-based coupling agent Evaluation The physical properties of the liquid crystal polyester resin compositions (A) to (G) each prepared from Examples 1 to 3 and Comparative Examples 1 to 4 were measured by the following method.

Measurement of Bar-Flow

Each of the liquid crystal polyester resin compositions (A) to (G) was measured for fluidity using an electric injector. The fluidity measurement was evaluated by measuring the fluidity length (Bar-Flow Length) of the composition specimens injected according to the injection speeds (50, 100, 200, 300 mm/sec) under the same conditions. The longer the fluidity length, the higher the fluidity. The barrel temperature of the injector was 360° C.

The results of the fluidity measurement for the liquid crystal polyester resin compositions (A) to (G) obtained from Examples 1 to 3 and Comparative Examples 1 to 4 are shown in Tables 2 and 3 below.

TABLE 2

Fluidity of Liquid crystal polyester resin compositions, Bar-Flow 0.2 T

| | Bar-Flow length (mm) | | | |
|---|---|---|---|---|
| | Injection speed 50 mm/sec | Injection speed 100 mm/sec | Injection speed 200 mm/sec | Injection speed 300 mm/sec |
| Example 1 (A) | 28.09 | 51.57 | 69.95 | 79.04 |
| Example 2 (B) | 27.69 | 50.82 | 68.44 | 78.85 |
| Example 3 (C) | 17.01 | 38.94 | 58.08 | 71.93 |
| C. Example 1 (D) | 20.22 | 45.22 | 60.11 | 68.88 |
| C. Example 2 (E) | 28.00 | 50.22 | 68.21 | 78.29 |
| C. Example 3 (F) | 12.78 | 42.89 | 43.53 | 48.48 |
| C. Example 4 (G) | 12.37 | 40.82 | 47.10 | 58.59 |

Table 2 indicates that the composition in which flat glass fibers were applied to the liquid crystal polyester resin obtained in Preparation Example 1 (Example 1) exhibits very high fluidity compared to the composition in which chopped glass fibers were applied (C. Example 1). High fluidity is shown when the flat glass fiber is 20 to 30% by weight, but when it exceeds 40% by weight, the fluidity of the molded article is adversely affected. The liquid crystal polyester resin obtained in Preparation Example 2 is inferior in fluidity to the same content of the inorganic filler than the liquid crystal polyester resin obtained in Preparation Example 1, which also indicates that the composition to which flat glass fibers were applied (Example 3) shows higher fluidity than the composition to which chopped glass fibers were applied (C. Example 4).

TABLE 3

Fluidity of Liquid crystal polyester resin compositions, Bar-Flow 0.1 T

| | Bar-Flow length (mm) | | | |
|---|---|---|---|---|
| | Injection speed 50 mm/sec | Injection speed 100 mm/sec | Injection speed 200 mm/sec | Injection speed 300 mm/sec |
| Example 1 (A) | 11.35 | 19.13 | 36.34 | 44.74 |
| Example 2 (B) | 11.40 | 19.01 | 36.56 | 44.31 |
| Example 3 (C) | 8.20 | 13.24 | 32.51 | 41.90 |
| C. Example 1 (D) | 5.92 | 9.79 | 24.06 | 37.40 |
| C. Example 2 (E) | 6.16 | 12.19 | 23.69 | 37.45 |
| C. Example 3 (F) | 5.91 | 10.11 | 24.71 | 35.52 |
| C. Example 4 (G) | 5.89 | 8.80 | 23.88 | 35.54 |

Table 3 indicates that the liquid crystal polyester resin composition to which flat glass fibers were applied (Example 1) shows remarkably excellent fluidity at all injection speeds compared to the resin composition to which chopped glass fibers were applied (C. Example 1), and in particular, the resin composition in which flat glass fibers were applied to the liquid crystal polyester resin obtained in Production Example 1 (Example 1) exhibits extremely high fluidity.

Table 4 below summarizes the injection speed/Bar-flow length when each injection speed is different, and shows the relative injection time (S: second) according to the injection speed.

TABLE 4

Fluidity of Liquid crystal polyester resin compositions, Bar-Flow 0.1 T

| | Relative injection time based on injection speed (s): Injection speed/Bar-Flow length | | | |
|---|---|---|---|---|
| | Injection speed 50 mm/sec | Injection speed 100 mm/sec | Injection speed 200 mm/sec | Injection speed 300 mm/sec |
| Example 1 (A) | 4.41 | 5.23 | 5.50 | 6.71 |
| Example 2 (B) | 4.39 | 5.26 | 5.47 | 6.77 |
| Example 3 (C) | 6.09 | 7.55 | 6.15 | 7.16 |
| C. Example 1 (D) | 8.44 | 10.21 | 8.31 | 8.02 |
| C. Example 2 (E) | 8.11 | 8.20 | 8.44 | 8.01 |
| C. Example 3 (F) | 8.46 | 9.89 | 8.09 | 8.45 |
| C. Example 4 (G) | 8.48 | 11.36 | 8.38 | 8.44 |

As can be seen from the table above, when the injection speed was 50 mm/sec, the relative injection time (s) was 4.41 to 6.09 in Examples 1 to 3, which was less than 7 (s); when the injection speed was 100 mm/sec, the relative injection time (s) was 5.23 to 7.55 in Examples 1 to 3, which was less than 8 (s); when the injection speed was 200 mm/sec, the relative injection time (s) was 5.50 to 6.15 in Examples 1 to 3, which was less than 7 (s); and when the injection speed was 300 mm/sec, the relative injection time (s) was 6.71 to 7.16 in Examples 1 to 3, which was less than 8 (s).

That is, the relative injection time of the liquid crystal polyester resin composition for ultra-thin injection molding according to the present disclosure is less than 8 (s) at maximum at 4 (s) or more in the range of 50 to 300 mm/sec injection speed, and thus has very excellent injection properties.

As described above, the liquid crystal polyester resin composition for ultra-thin injection molding according to the examples of the present disclosure exhibited excellent fluidity and high injection efficiency since the relative injection time was smaller than that of the comparative examples.

Measurement of Tensile Strength

The tensile strength for each of the liquid crystal polyester resin compositions (A) to (G) was measured according to ASTM D638, and the results are shown in Table 5 below.

Measurement of Flexural Strength

The flexural strength for each of the liquid crystal polyester resin compositions (A) to (G) was measured according to ASTM D790, and the results are shown in Table 5 below.

Measurement of Heat Resistance (Heat Deflection Temperature)

The heat resistance for each of the liquid crystal polyester resin compositions (A) to (G) was measured according to ASTM D648, and the results are shown in Table 5 below. The pressure applied in this measurement method was 1.82 MPa.

TABLE 5

Physical properties of liquid crystal polyester resin composition

| | Tensile strength (MPa) | Flexural strength (MPa) | Heat resistance (° C.) |
|---|---|---|---|
| Example 1 (A) | 133 | 218 | 325 |
| Example 2 (B) | 128 | 205 | 322 |
| Example 3 (C) | 129 | 209 | 278 |
| C. Example 1 (D) | 125 | 200 | 325 |
| C. Example 2 (E) | 118 | 171 | 321 |
| C. Example 3 (F) | 120 | 200 | 325 |
| C. Example 4 (G) | 120 | 194 | 278 |

Table 5 indicates that the liquid crystal polyester resin compositions to which glass fibers of a relatively short length were applied as in Comparative Examples exhibited somewhat low tensile strength and flexural strength. On the contrary, it was confirmed that the tensile strength and flexural strength were excellent when the length of the glass fibers was relatively long and the average cross-sectional aspect ratio was 4 to 6 as in the Examples. In particular, it was found that the flexural strength was greatly improved when flat glass fibers having an average cross-sectional aspect ratio of 4 to 6 were used as the inorganic filler. Further, Table 5 shows that there is little change in the heat resistance according to the type of glass fibers, but it can be seen that the heat resistance varies greatly depending on the type of liquid crystal polyester resins prepared in Preparation Examples 1 and 2.

It was confirmed that the use of the liquid crystal polyester resin compositions obtained from the above examples can achieve the ultra-thin film molding of electronic accessories mounted inside an electronic device, thereby enabling miniaturization and high density of electronic products.

The invention claimed is:

1. A liquid crystal polyester resin composition for ultra-thin injection molding having a thickness of 0.1 mm or less, comprising 60 to 85% by weight of a liquid crystal polyester resin and 15 to 40% by weight of an inorganic filler,
wherein the liquid crystal polyester resin composition has a weight average molecular weight of about 10,000 to 300,000, 0.1 to 10 mol % of hydroxybenzoic acid (HBA), 40 to 60 mol % of hydroxynaphthoic acid, 20 to 30 mol % of biphenol, and 20 to 30 mol % of terephthalic acid, wherein a relative injection time of the liquid crystal polyester resin composition is 4 seconds or more and less than 8 seconds if an injection speed is in a range of 50 to 300 mm/sec, and wherein the inorganic filler comprises flat or milled glass fiber having an average length of 1 to 5 mm and an average cross-sectional aspect ratio of 2 to 6, and at least one selected from the group consisting of carbon black, zirconia fiber, silicon nitride fiber, and boron fiber.

2. The liquid crystal polyester resin composition of claim 1, wherein the liquid crystal polyester resin is a wholly aromatic liquid crystal polyester formed using only an aromatic compound as a monomeric material.

3. The liquid crystal polyester resin composition of claim 1, wherein the inorganic filler is surface-treated in advance with a coupling agent, or the inorganic filler and the coupling agent are added together when preparing the liquid crystal polyester resin composition.

4. The liquid crystal polyester resin composition of claim 3, wherein the coupling agent is a functional compound selected from the group consisting of an epoxy compound, an isocyanate compound, a titanate compound, and a silane compound.

* * * * *